July 19, 1949.  E. G. RATZ  2,476,909
CASING FOR ELECTRICAL MEASURING DEVICES
WITH ATMOSPHERIC CONDITIONER
Filed Aug. 25, 1944
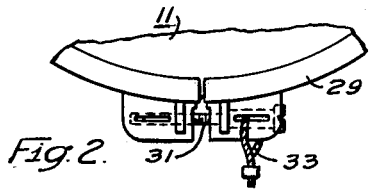
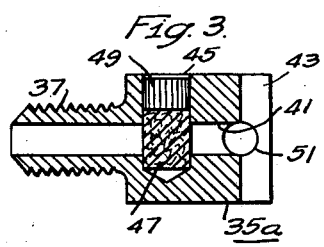
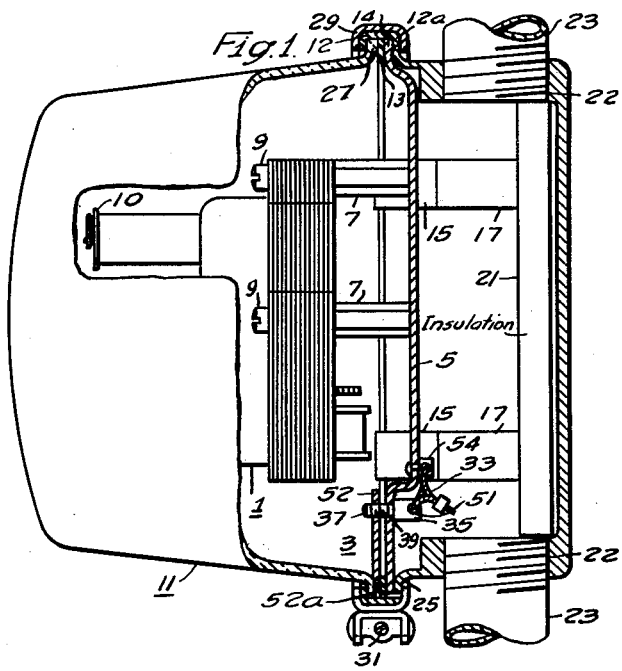
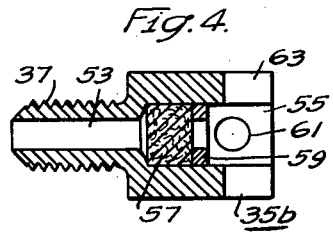
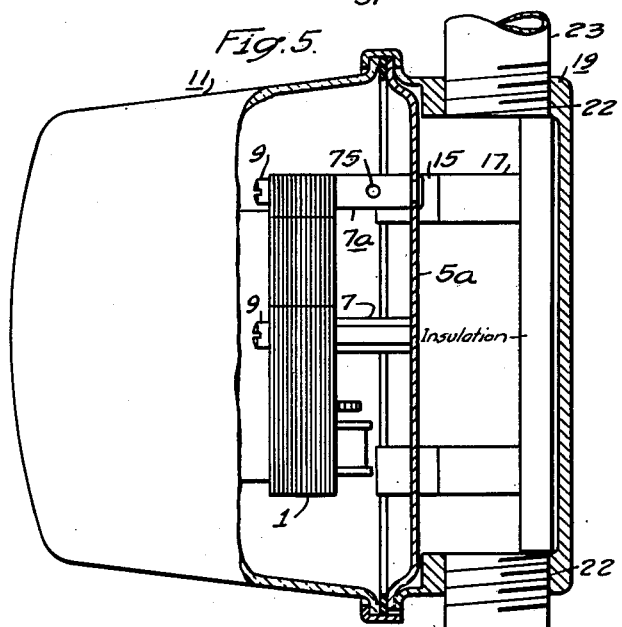
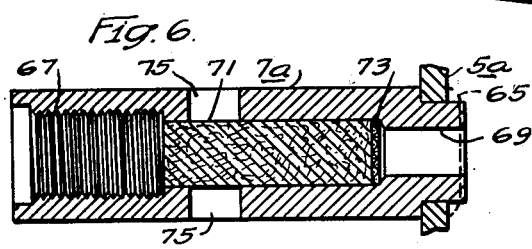
INVENTOR
Elmer G. Ratz.
BY C. L. Freedman
ATTORNEY Patented July 19, 1949

2,476,909

UNITED STATES PATENT OFFICE 2,476,909

CASING FOR ELECTRICAL MEASURING DEVICES WITH ATMOSPHERIC CONDITIONER

Elmer G. Ratz, Hamilton, Ontario, Canada, assignor to Westinghouse Electric Corporation, East Pittsburgh, Pa., a corporation of Pennsylvania Application August 25, 1944, Serial No. 551,197

3 Claims. (Cl. 171—34)

This invention relates to electrical measuring devices and it has particular relation to watt-hour meters suitable for outdoor mounting.

Electrical measuring devices such as watt-hour meters which are designed for outdoor mounting generally employ a container within which the watt-hour meter is located. This container may comprise a base plate and a cover which have a gasket therebetween. However, openings conventionally are provided to establish communication between the interior and exterior of the container. Such openings are desirable for the purpose of minimizing condensation of moisture within the container. The moisture not only would tend to corrode parts of the watt-hour meter but would, in some cases, interfere with the inspection or reading of the watt-hour meter through the cover. It should be noted further that the prior art suggests the elimination of all openings by the provision of a hermetically sealed container such as that illustrated in the Madden Patent 2,320,946.

In accordance with the invention, a watt-hour meter is positioned within a substantially airtight container. This container is provided with a breathing device which includes a filter. The breathing device establishes communication between the interior and exterior of the container and the filter inhibits transmission of particles such as dust or moisture through the breathing device.

As shown in the Bradshaw et al. Patent 1,969,499, a watt-hour meter is provided with terminals such as contact blades which project from the container within which the watt-hour meter is enclosed. These contact blades may be received in contact jaws located in a socket which defines a substantially closed chamber therefor. Sealing means may be provided for maintaining the watt-hour meter, the container and the socket in assembled relationship.

When a breathing device is provided in accordance with the teachings of this invention, the breathing device may establish communication between the container and the chamber formed by the socket associated therewith. Such a location of the breathing device protects the breathing device by the same sealing means employed for maintaining the container and socket in assembled relationship. Furthermore, the breathing device may be located substantially in the socket to permit removal of the breathing device when the meter and its container are removed from the associated socket. Finally, it may be noted that the chamber formed by the socket and its associated conduit provides an ample supply of air for the watt-hour meter. If sealing means are desired for preventing unauthorized separation of the cover and base plate of a container when the container is detached from its associated socket, the breathing device may be employed as part of such sealing means.

It is therefore an object of the invention to provide an electrical measuring device with a container having a breathing device including a filter associated therewith.

It is a further object of the invention to provide a watt-hour meter assembly which includes a container for a watt-hour meter and a chamber for the watt-hour meter terminals with a breathing device and a filter establishing communication between the interior of the container and the chamber.

It is an additional object of the invention to provide a watt-hour meter assembly which includes a container for a watt-hour meter and socket associated with the container for receiving the watt-hour meter terminal means with a breathing device and filter located substantially within the socket.

It is another object of the invention to provide an electrical measuring device with a container having a breathing device associated therewith, wherein the breathing device assists in sealing the container against unauthorized access to the measuring device therein.

Other objects of the invention will be apparent from the following description taken in conjunction with the accompanying drawing in which:

Figure 1 is a view in elevation with parts broken away of a watt-hour meter assembly embodying the invention;

Fig. 2 is a view in front elevation with parts broken away of the watt-hour meter assembly illustrated in Fig. 1;

Figs. 3 and 4 are views in sectional elevation of breathing devices suitable for the watt-hour meter assembly of Fig. 1;

Fig. 5 is a view in side elevation with parts broken away of a watt-hour meter assembly showing a modified form of the invention, and Fig. 6 is a view in sectional elevation showing a breathing device suitable for the watt-hour meter assembly of Fig. 5.

Referring to the drawing, Fig. 1 shows a watt-hour meter assembly which includes a watt-hour meter 1 positioned within a container 3. The container 3 includes a base plate 5 having posts 7 secured thereto. The watt-hour meter 1 may be attached to the posts 7 by means of suitable machine screws 9. The container 3 is completed by a cup-shaped cover 11 which may be formed in part or completely of a light-permeable material such as glass. Portions of the watt-hour meter 1 such as a register 10 may be inspected through the light-permeable cover 11. The cover 11 may be secured to the base plate 5 in any suitable manner and a gasket 13 of resilient material such as cork may be interposed therebetween for the purpose of providing a substantially air-tight container. As shown in Fig. 1, the cover 11 has a rim 12 secured permanently thereto. This rim has inturned lips 12a spaced therearound which engage tongues 14 projecting from the base plate 5 to form therewith bayonet securing means for the cover and base. By rotating the cover relative to the base 5 the cover may be removed therefrom. Securing means of this type are shown in the aforesaid Bradshaw et al. patent.

In order to establish connections for the watt-hour meter, terminal means which may take the form of contact blades 15 pass through the base plate 5 and are insulated therefrom. These contact blades are received in contact jaws 17 which are mounted within a socket 19. The contact jaws 17 may be secured to insulating material 21 which in turn is secured to a portion of the socket. Threaded openings 22 are provided in the socket 19 for the reception of threaded conduits 23. As well understood in the art, line and load conductors may be run through the conduits for the purpose of connecting the contact jaws 17 to external lines and loads.

It will be noted that the socket 19 includes a flange 25 which is positioned adjacent the periphery of the base plate 5 and that the cover 11 also has a flange 27 which engages the gasket 13. These flanges may be embraced by a split sealing ring 29. In accordance with conventional practice, the ends of the sealing ring may be secured to each other by means of a machine screw 31 and a sealing wire 33 may be passed through the head of the screw 31 for preventing unauthorized removal of the screw (see Fig. 2). The portions of Fig. 1 thus far specifically described may be similar in construction to those shown in the aforesaid Bradshaw et al. patent.

For the purpose of establishing communication between the interior of the container 3 and the chamber formed by the socket 19, a breathing device 35 is secured to the base plate 5. As shown in Fig. 1, the breathing device 35 includes a threaded portion 37 which is positioned in an opening 39 provided in the base plate 5. Suitable constructions for the breathing device 35 are illustrated in Figs. 3 and 4.

In Fig. 3, a breathing device 35a is disclosed which may be employed as the breathing device 35 of Fig. 1. The breathing device 35a has an axial opening 41 extending completely therethrough. If desired, a screwdriver slot 43 may be provided in the head of the breathing device to facilitate insertion and removal of the breathing device.

A second opening 45 extends radially into the head of the breathing device 35a. This opening 45 is larger in diameter than the opening 41. It extends across the opening 41 but does not pass completely through the head of the device 35a. By inspection of Fig. 3 it will be noted that a filter material 47 is positioned within the opening 45 and extends completely across the opening 41. The material 47 may be maintained in position by means of a plug 49 which is positioned within the opening 45 and which is proportioned to have a press fit with the head of the breathing device 35a. An additional opening 51 may be drilled through the head of the breathing device for the purpose of receiving a sealing wire. It will be understood that all air entering the container 3 through the breathing device 35a must pass through the filter material 47.

The filter material 47 may be formed of a material capable of filtering particles such as dust from air passing therethrough. If desired the filter may be formed of a material capable of removing moisture from air passing therethrough or it may be capable of removing both dust and moisture from the air. Glass wool has been satisfactorily employed as the filter material 47 for dust removal. Other filter materials for dust removal are cotton wool, glass wick and cotton wick.

For moisture removal the filter material 47 may be formed in part or entirely of silica gel or calcium chloride. Such materials also may be additionally effective for dust removal.

If desired the filter material 47 may be formed in part of dust removing material, such as glass wool, and in part of a moisture removing material, such as silica gel.

Referring to Fig. 1, it will be noted that the breathing device 35 is located substantially within the socket 19. Since the socket is inaccessible until the sealing ring 29 and the container 3 are removed therefrom, it is clear that the breathing device is protected against tampering by unauthorized persons. In addition, the chamber formed by the socket 19 and the conduits 23 provide an adequate source of air for the container 3.

The device 35 may be received in a threaded opening in the base plate 5. However, in accordance with a further aspect of the invention, the device 35 forms part of a seal between the base plate 5 and the cover 11. This seal prevents unauthorized access to the meter when the meter and its container are removed from the associated socket.

As shown in Fig. 1, the cover 11 has associated therewith in any suitable manner a bar 52 having a threaded opening therein for reception of the threaded portion 37 of the breathing device. Conveniently the bar 52 may be disposed in a pocket 52a formed in the cover 11 and may be suitably secured to the gasket 13, as by rivets (not shown). By reference to Fig. 1 it will be noted that the threaded portion 37 of the device 35 passes through the opening 39 in the base plate into threaded engagement with the bar 52. Consequently, the cover cannot be removed from the base plate until the device 35 has been removed. A sealing wire 33a may be passed through the opening 51 and a hole in a post 54 which is secured to the base plate 5. This sealing wire must be cut and removed prior to withdrawal of the device 35. Therefore, the sealing wire 33a prevents unauthorized access to the meter when the container 3 is removed from the associated socket.

In Fig. 4 a breathing device 35b is illustrated which may be employed as the breathing device 35 of Fig. 1. In the modification of Fig. 4, an axial opening 53 is provided which extends completely through the device 35b. This axial opening is provided at one end with a counterbore 55 for receiving a filter material 57 which corresponds to the filter material 47 of Fig. 3. The material 57 may be maintained in position by means of a metallic ring 59 which has a press fit within the counterbore 55. An auxiliary opening 61 (corresponding to the opening 51 of Fig. 3) may be drilled through the head of the breathing device 35b and the head may be provided with a screwdriver slot 63.

If desired, the breathing device 35 of Fig. 1 may be incorporated in one of the posts 7. This construction is illustrated in Fig. 5 wherein a base plate 5a is provided which corresponds to the base plate 5 of Fig. 1. In addition, one of the posts 7 of Fig. 1 is replaced by a post 7a which is designed to serve as a breathing device. The structure of the post 7a is shown more clearly in Fig. 6. It will be observed that the post 7a has a portion of reduced diameter passing through the base plate 5a. The exposed portion of the post 7a is upset or spun into the shape indicated by the dotted line 65 in Fig. 6 to secure the post 7a firmly to the base plate 5a. Female threads 67 are provided in the post 7a for the reception of one of the machine screws 9.

The post 7a has an axial opening 69 extending therethrough and one end of the axial opening is counterbored to receive filter material 71 which corresponds to the filter material 47 and 57 of Figs. 3 and 4. To retain the material 71 in position, a disk of wire mesh or screen 73 may be positioned adjacent the seat formed by the counterbore. It will be noted that radial openings 75 are provided in the post 7a. Air may pass between the container of Fig. 5 and the socket 19 through the openings 75, the filter 71 and the axial opening 69. Except for the changes specifically described, the structure of the watt-hour meter assembly illustrated in Fig. 5 is similar to that of Fig. 1.

Although the invention has been described with reference to certain specific embodiments thereof, numerous modifications are possible. Therefore, the invention is to be restricted only by the appended claims as interpreted in view of the prior art.

I claim as my invention:

1. In an electrical measuring device, an electro-responsive watt-hour meter measuring unit, including display means for depicting the value of the quantity measured by the measuring unit, a substantially air-tight container for said measuring unit, said container including a light-permeable portion permitting inspection therethrough of the display means from a position external to said container, and breathing means for said container, said breathing means comprising a member securing the measuring unit to the container and extending through a wall of said container, said member having an opening extending therethrough for establishing communication between the interior and exterior of the container, and filter material disposed in said opening for preventing passage therethrough of particles of matter.

2. In an electrical measuring device, an electro-responsive measuring unit including display means for depicting the value of the quantity measured by the measuring unit, a substantially air-tight container for said measuring unit, said container including a light-permeable portion permitting inspection therethrough of the display means from a position external to said container, a support for said measuring unit secured to said container, means securing said measuring unit to said support, the support having an opening extending therethrough for establishing communication between the interior and exterior of the container, and filter material disposed in the opening for inhibiting passage of particles therethrough.

3. In an electrical measuring device, an electro-responsive measuring unit including display means for depicting the value of the quantity measured by the measuring unit, a substantially air-tight container for said measuring unit, said container including a light-permeable member permitting inspection therethrough of the display means from a position external to the container, and a member detachably secured to the light-permeable member for permitting access to the interior of the container, breathing means associated with one of said members for permitting passage of air between the interior and exterior of the container, said breathing means comprising a filter for inhibiting the passage of particles therethrough to the interior of the container, and means controlled by said breathing means for locking said members in assembled relationship, said breathing means being operable for releasing said locking means to permit separation of said members.

ELMER G. RATZ.

REFERENCES CITED

The following references are of record in the file of this patent:

UNITED STATES PATENTS

| Number | Name | Date |
| --- | --- | --- |
| 1,338,358 | Champlin | Apr. 27, 1920 |
| 1,720,516 | Hill et al. | July 9, 1929 |
| 1,743,167 | Styer | Jan. 14, 1930 |
| 1,893,177 | Mylins et al. | Jan. 3, 1933 |
| 2,069,242 | Graham | Feb. 2, 1937 |
| 2,112,322 | Wyatt | Mar. 29, 1938 |
| 2,147,108 | Rylsky | Feb. 14, 1939 |
| 2,334,885 | Roudnicky | Nov. 23, 1943 |